United States Patent
Hatano et al.

(10) Patent No.: US 6,931,069 B2
(45) Date of Patent: Aug. 16, 2005

(54) CODING DEVICE AND CODING METHOD

(75) Inventors: Yoshiko Hatano, Tokyo (JP); Junko Kijima, Tokyo (JP); Mamoru Inamura, Tokyo (JP); Tomoaki Ikeda, Hyogo (JP); Kazuhiro Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 555 days.

(21) Appl. No.: 09/800,895

(22) Filed: Mar. 8, 2001

(65) Prior Publication Data

US 2001/0021226 A1 Sep. 13, 2001

(30) Foreign Application Priority Data

Mar. 8, 2000 (JP) ...................................... P2000-063197

(51) Int. Cl.[7] ........................... H04N 7/12; H04N 11/02
(52) U.S. Cl. .............................. 375/240.24; 375/240.07
(58) Field of Search ....................... 375/240.12, 240.23, 375/240.24; 341/67, 51; 370/503; 382/232

(56) References Cited

U.S. PATENT DOCUMENTS

| | | | | |
|---|---|---|---|---|
| 5,631,644 A | * | 5/1997 | Katata et al. ................. | 341/67 |
| 5,668,598 A | | 9/1997 | Linzer et al. | |
| 5,717,641 A | * | 2/1998 | Ando et al. ................. | 365/191 |
| 5,986,712 A | | 11/1999 | Peterson et al. | |
| 6,157,674 A | * | 12/2000 | Oda et al. .................... | 375/240 |
| 6,219,381 B1 | * | 4/2001 | Sawada et al. ........ | 375/240.14 |
| 6,289,129 B1 | * | 9/2001 | Chen et al. ................. | 382/232 |
| 6,415,398 B1 | * | 7/2002 | Kikuchi et al. ............. | 714/701 |
| 6,608,628 B1 | * | 8/2003 | Ross et al. .................. | 345/619 |
| 6,668,015 B1 | * | 12/2003 | Kranawetter et al. .. | 375/240.12 |

FOREIGN PATENT DOCUMENTS

| | | |
|---|---|---|
| EP | 0 660 612 A2 | 6/1995 |
| EP | 0 757 490 A2 | 2/1997 |

OTHER PUBLICATIONS

"Everything About MPEG—4", Institute of INdustrial Research pp. 39–40.

"Robust Video Coding Algorithms and Systems", John D. Villasenor, et al, proceedings of the IEEE, vol. 87, No. 10, Oct. 1999.

* cited by examiner

Primary Examiner—Chris Kelley
Assistant Examiner—Erick Rekstad
(74) Attorney, Agent, or Firm—Birch, Stewart, Kolasch & Birch, LLP

(57) ABSTRACT

To provide a coding device which does not generate a video packet having only a stuffing but can insert a minimum stuffing to prevent an underflow of a buffer in the case in which a video packet has a length limit. A minimum code volume (Tmin) is set for each VOP and a break of a video packet and an insertion of a stuffing are determined such that a code volume (Sc) of the VOP is not smaller than the minimum code volume (Tmin).

14 Claims, 9 Drawing Sheets

F I G. 2
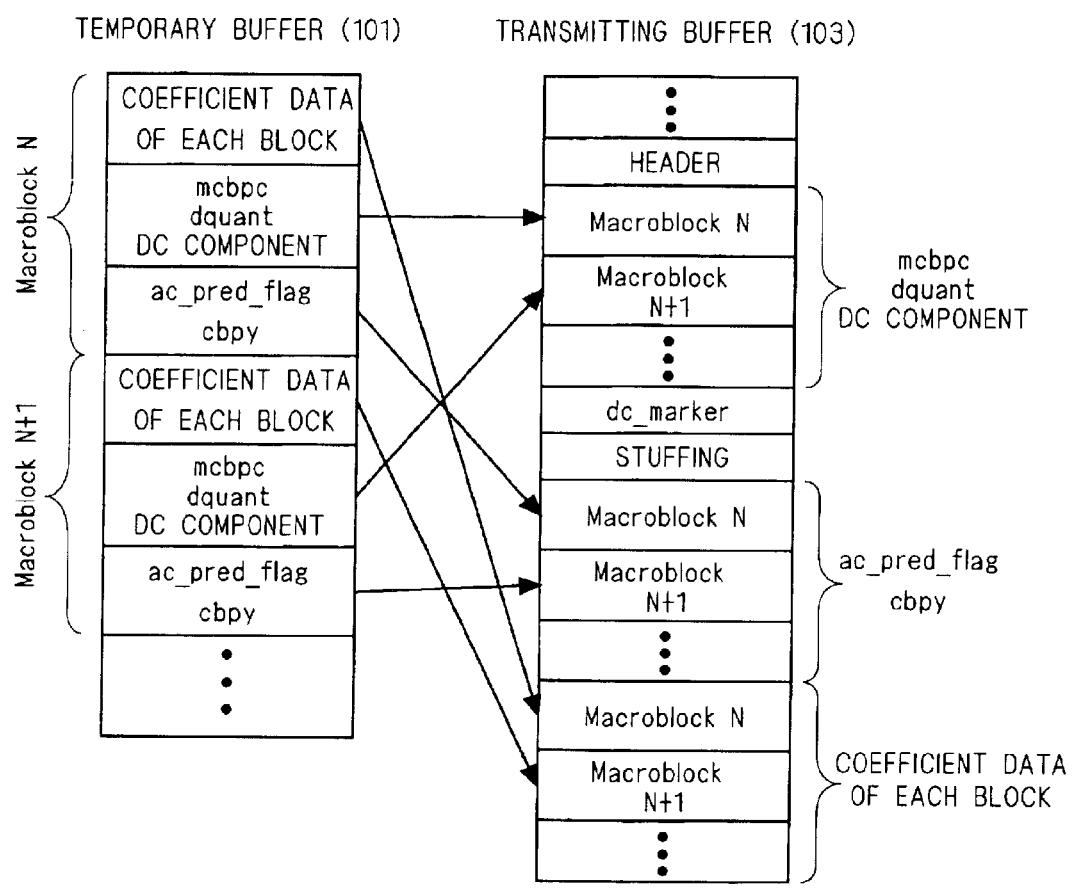

F I G. 3
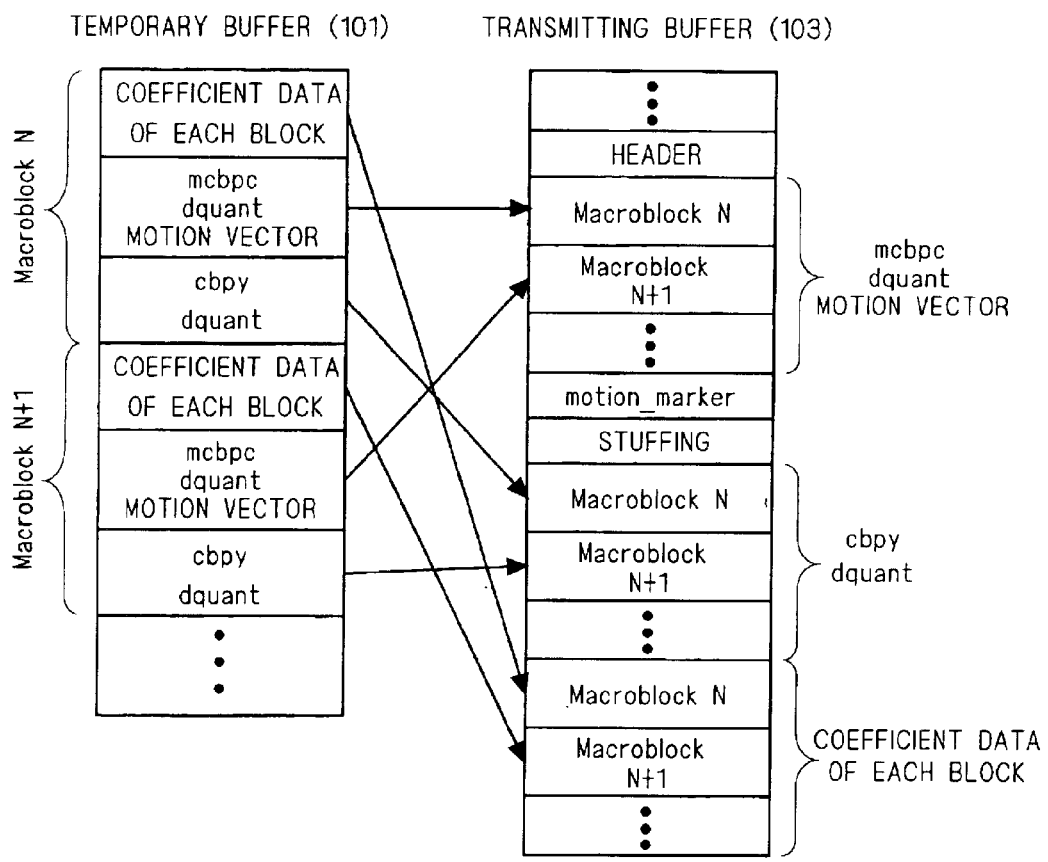

EQUATION (1) IS ESTABLSHED

EQUATION (1) IS NOT ESTABLISHED BUT EQUATION (2) IS ESTABLISHED

EQUATION (2) IS NOT ESTABLISHED

FIG. 7
CONVENTIONAL ART
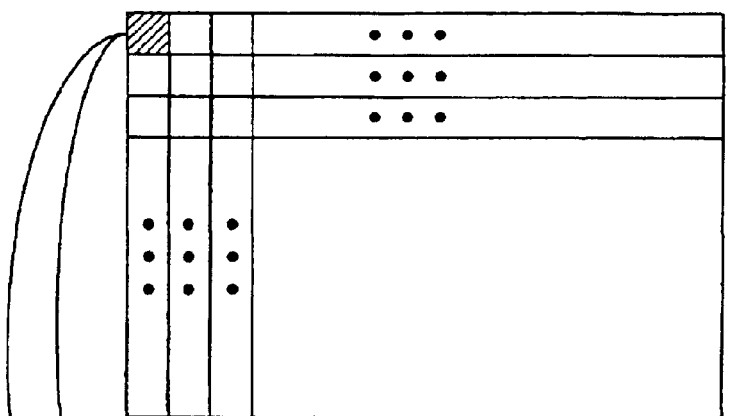
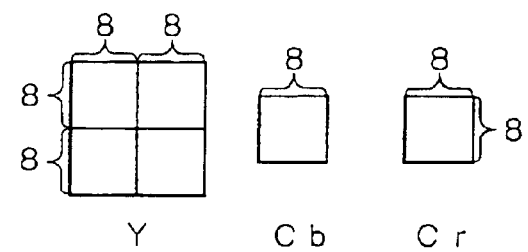

BIT STREAM FOR 1VOP

BIT STREAM OF VIDEO PACKET 0

BIT STREAM OF VIDEO PACKET 1

BIT STREAM WITH STUFFING

CODING DEVICE AND CODING METHOD

BACKGROUND OF THE INVENTION

1. Field of the Invention

The present invention relates to a coding device and a coding method for coding a video signal by using a video packet having a length limit set thereto which is related to a portable telephone, a TV telephone system and the like, for example.

2. Description of the Background Art

FIG. 6 is a block diagram showing a conventional coding device described in "Everything about MPEG-4" (Institute of Industrial Research) P. 39 to P. 40, for example, FIG. 7 is a diagram illustrating an input signal of the conventional coding device, FIGS. 8A to 8D are diagrams illustrating a structure of a bit stream, and FIG. 9 is a diagram illustrating a position (arrangement) of a video packet over a screen (display state).

In FIG. 6, the reference numeral 1 denotes a subtracter for receiving an external input signal (a luminance signal, a color difference signal or the like) sent externally as a first input. An output of the subtracter 1 is input to a DC/AC predictor 4 for predicting a quantized value of each component of a direct current (DC) and an alternating current (AC) and a reverse quantizer 6 through DCT (Discrete Cosine Transform) means 2 and a quantizer 3. Moreover, an output of the DC/AC predictor 4 is sent to a first input of variable—length coding means 5, and the variable—length coding means 5 outputs a bit stream.

On the other hand, an output of the reverse quantizer 6 to which an output of the quantizer 3 is input is sent to a first input of an adder 8 through reverse DCT means 7. An output of the adder 8 is sent to a memory 9, and an output of the memory 9 is sent to a first input of predicted image forming means 10 and a first input of motion detecting means 11.

An external input signal is sent to a second input of the motion detecting means 11, and an output of the motion detecting means 11 is sent to a second input of the predicted image forming means 10 and a motion vector predictor 12.

An output of the motion vector predictor 12 is sent to a second input of the variable—length coding means 5. Moreover, an output of the predicted image forming means 10 is sent to a second input of the subtracter 1 and a second input of the adder 8.

Next, an operation will be described. First of all, a video signal is divided into macroblocks to be basic processing units as shown in FIG. 7 and is input as an external input signal (the external input signal is basically input as a macroblock, and means for generating a macroblock may be provided in a former stage such that a conversion into a macroblock is carried out even if the macroblock is directly input).

More specifically, in the case in which a video signal to be input is 4:2:0 (which indicates that the number of pixels of luminance information Y is a double in horizontal and vertical directions for the number of pixels of color difference information Cb and Cr), a size of 16 pixels×16 lines of the luminance signal (Y) becomes equal to that of 8 pixels×8 lines of two color difference signals (Cb, Cr) over a screen.

Accordingly, six blocks of 8 pixels×8 lines (including four blocks for the luminance signal and two blocks for the color difference signal) constitute one macroblock.

It is premised that a Video Object Plane (VOP which is a unit image) to be input as an external input has a rectangular shape and is identical to a frame.

Each block is subjected to the discrete cosine transform (DCT) and is quantized in the quantizer 3. After a coefficient of each component of the DC and the AC is predicted in the DC/AC predictor 4, a DCT coefficient thus quantized is variable—length coded together with additional information such as a quantization parameter.

The foregoing implies intracoding (which is also referred to as in—frame coding). A VOP applying the intracoding to all the macroblocks is referred to as an I—VOP (Intra—VOP).

On the other hand, the quantized DCT coefficient is reversely quantized in the reverse quantizer 6 and is decoded by the reverse DCT in the reverse DCT means 7, and a decoded image is stored in the memory 9 through the adder 8. The decoded image stored in the memory 9 is used when interceding (which is also referred to as interframe coding) is to be carried out.

In the case of the interceding, a motion vector indicative of a motion of a macroblock which is input as an external input signal is detected in the motion detecting means 11. The motion vector indicates such a position that an error is minimized with respect to the input macroblock in the decoded images stored in the memory 9.

The predicted image forming means 10 forms a predicted image based on the motion vector detected by the motion detecting means 11.

Subsequently, a differential signal between the input macroblock and the predicted image formed by the predicted image forming means 10 is obtained, is subjected to the DCT in the DCT means 2 and is quantized in the quantizer 3.

A transformation coefficient thus quantized is variable—length coded (interceded) together with the motion vector thus predicted and coded and additional information such as a quantization parameter. Moreover, the quantized DCT coefficient is reversely quantized in the reverse quantizer 6 and is subjected to the reverse DCT in the reverse DCT means 7, and is then added to the predicted image by the adder 8 and is stored in the memory 9.

The intercoding includes one—way prediction in which prediction is carried out based on only a former VOP on a time basis in order of display of the image and bidirectional prediction in which prediction is carried out based on former and latter VOPs on a time basis. The VOP coded through the one—way prediction will be referred to as a P—VOP (Predictive VOP) and the VOP coded through the bi-directional prediction will be referred to as a B—VOP (Bidirectionally Predictive VOP).

Next, a structure of a bit stream output from the variable—length coding means 5 will be described with reference to FIGS. 8A to 8D. As shown in FIG. 8A, a bit stream of 1VOP is constituted by (a bit stream of) one video packet or more.

One video packet is formed by coded data of one macroblock or more. For a first video packet of the VOP, a VOP header is attached to a head and a stuff bit for a byte alignment is attached to an end (FIG. 8B).

In the case of second and succeeding video packets, Resync Marker for detecting a head of the video packet and a video packet header are attached to a head, and a stuff bit is attached to an end (FIG. 8C).

The stuff bit is added up to a termination (break) of the video packet in a unit of 1 to 8 bits in order to adjust the byte alignment to be attached to the end of the video packet and the meaning thereof is distinguished from that of a stuffing which will be described below.

As shown in FIG. 8D, moreover, an optional number of stuffings can also be put in the video packet. For example, in the case of MPEG4 Video, the stuffing is referred to as a stuffing macroblock and can be put in an optional video packet in the same manner as the macroblock. The stuffing is discarded (is not substantially utilized) on the decoder side.

The stuffing is used as a word having 9 bits or 10 bits for the stuffing irrespective of the byte alignment (for example, the termination of the video packet is adjusted) and is inserted between the macroblocks, of which meaning is distinguished from the meaning of the stuff bit.

An optional number of macroblocks can be put in one video packet. In the case in which error propagation is taken into consideration, it is generally preferable that a code volume of each video packet should be almost constant. In the case in which the code volume of the video packet is thus set to be almost constant, a rate (area) occupied by each video packet in the 1VOP is not constant as shown in FIG. 9.

In the conventional coding device described above, there has not been considered control of the code volume which is to be carried out when a length of the video packet is limited.

For example, in the case in which a reversible variable—length code is to be used in the variable—length coding means 5, the decoder decodes the variable—length code in a reverse direction from an end of the video packet even if an error is made in an operation for decoding the variable—length code in a forward direction from a head of the video packet. Thus, the variable—length code can be decoded.

In this case, it is necessary to retain one video packet in a receiving buffer on the decoder side. Therefore, a limit is sometimes set to a length of the video packet in order to define a size of the receiving buffer.

In such a case, a coding device should control a code volume such that the length of each video packet is set to be a predetermined length or less.

Moreover, the coding device should manage a volume of generated codes such that a transmitting buffer (not shown) which is provided in a latter stage of the variable—length coding means 5 does not cause an overflow and an underflow.

The quantization parameter to be used in the quantizer 3 is usually adjusted to increase or decrease the code volume. If the code volume is extremely small as in a static image, it is necessary to insert the stuffing, thereby increasing the code volume such that the transmitting buffer does not cause the underflow.

The stuffing does not have information which is substantially related to the decoding. Therefore, it is desirable that the stuffing should not be inserted if possible. For this reason, generally, a minimum stuffing is inserted if the code volume is small after the 1VOP is completely coded.

In the case in which the limit is set to the length of the video packet, the stuffing cannot perfectly enter one video packet when the stuffing is inserted after the 1VOP is completely coded.

For example, in the case of a static image formed by computer graphics, few codes are generated if the coding is carried out with the P—VOP. On the other hand, in such a structure that the static image is to be coded, a signal indicative of the underflow is output from the transmitting buffer and an operation is carried out to insert the stuffing based on the signal.

When the stuffing is inserted into a last video packet of the VOP according to the operation, it is sometimes generated (inserted) beyond the limit of the length of the video packet. On condition that a limit is set to a capacity per video packet and the video packet having only the stuffing is prohibited, there has conventionally been a problem in that the length limit of the video packet cannot be maintained or the video packet having only the stuffing is generated.

SUMMARY OF THE INVENTION

A first aspect of the present invention is directed to a coding device comprising coding means for coding an external input signal in a macroblock unit, first storing means for storing a code output from the coding means, second storing means for storing an output from the first storing means, and code volume control means for controlling transfer of the code stored in the first storing means to the second storing means based on a code volume of the code obtained by the coding means such that a length of a video packet constituted by the code is a predetermined length or less.

A second aspect of the present invention is directed to the coding device, wherein the code volume control means controls storage of a stuffing in the second storing means based on a minimum code volume obtained for each unit image constituted by a video packet which is required for coding the unit image.

A third aspect of the present invention is directed to the coding device, wherein the code volume control means determines a minimum code volume Tmin to satisfy a following equation:

$$Tmin \leq 2 \cdot Rp - B \quad Rp = R/F$$

wherein a bit count read from the second storing means in a unit image is represented by Rp, an occupancy in the second storing means (a data capacity stored in the second storing means) is represented by B, a bit rate read from the second storing means is represented by R, and a rate of a unit image to be coded is represented by F.

A fourth aspect of the present invention is directed to the coding device, wherein the code volume control means determines a minimum code volume Tmin to satisfy a following equation:

$$Tmin \geq vbv\_bits + 2 \cdot Rp - vbv\_bs \quad Rp = R/F$$

wherein a bit count read from the second storing means in a unit image is represented by Rp, an occupancy of a VBV buffer in a last unit image (a data capacity retained in the VBV buffer) is represented by vbv_bits, a size of the VBV buffer is represented by vbv_bs, a bit rate read from the second storing means is represented by R, and a rate of a unit image to be coded is represented by F.

A fifth aspect of the present invention is directed to the coding device, wherein the code volume control means determines a minimum code volume Tmin based on a following equation or a value having a result equivalent to a result of the equation:

$$Tmax = \max(2 \cdot Rp - B, vbv\_bits + 2 \cdot Rp - vbv\_bs) \quad Rp = R/F$$

wherein a bit count read from the second storing means in a unit image is represented by Rp, an occupancy in the second storing means (a data capacity stored in the second storing means) is represented by B, an occupancy of a VBV buffer in a last unit image (a data capacity retained in the VBV buffer) is represented by vbv_bits, a size of the VBV buffer is represented by vbv_bs, a bit rate read from the second storing means is represented by R, and a rate of a unit image to be coded is represented by F.

A sixth aspect of the present invention is directed to the coding device, wherein the bit rate R read from the second storing means is variable.

A seventh aspect of the present invention is directed to the coding device, wherein the code volume control means inserts a stuffing into a video packet until a first relationship is not satisfied, when a present code volume of a unit image including a last coded macroblock constituting the unit image is smaller than the minimum code volume Tmin of the unit image and a number M of macroblocks to be coded subsequently to the last coded macroblock, a predetermined length VPlen of the video packet, the minimum code volume Tmin and the present code volume Sc have the first relationship:

$$M \cdot VPlen < Tmin - Sc,$$

the code volume control means constitutes a video packet next to the video packet by a macroblock next to the last coded macroblock without inserting a stuffing into the video packet, when the first relationship is not established and the number M of macroblocks, the length VPlen of a video packet, the minimum code volume Tmin and the present code volume Sc have a second relationship:

$$(M-1) \cdot VPlen < Tmin - Sc.$$

An eighth aspect of the present invention is directed to a coding method comprising the steps of (a) coding an external input signal in a macroblock unit, (b) storing a code obtained at the step (a), (c) controlling an output of the code stored at the step (b) such that a length of a video packet constituted by the code obtained at the step (a) is a predetermined length or less based on a code volume of the code, and (d) storing the output controlled by the step (c).

A ninth aspect of the present invention is directed to the coding method, wherein the step (c) serves to control storage of a stuffing at the step (d) based on a minimum code volume obtained for each unit image constituted by a video packet which is required for coding the unit image.

A tenth aspect of the present invention is directed to the coding method, wherein the step (c) serves to determine a minimum code volume Tmin to satisfy a following equation:

$$Tmin \geq 2 \cdot Rp - B \quad Rp = R/F$$

wherein a bit count read by the step (d) in a unit image is represented by Rp, an occupancy in the step (d) (a data capacity stored in the step (d)) is represented by B, a bit rate read by the step (d) is represented by R, and a rate of a unit image to be coded is represented by F.

An eleventh aspect of the present invention is directed to the coding method, wherein the step (c) serves to determine a minimum code volume Tmin to satisfy a following equation:

$$Tmin \geq vbv\_bits + 2 \cdot Rp - vbv_{13} bs \quad Rp = R/F$$

wherein a bit count read by the step (d) in a unit image is represented by Rp, an occupancy of a VBV buffer in a last unit image (a data capacity retained in the VBV buffer) is represented by vbv_bits, a size of the VBV buffer is represented by vbv_bs, a bit rate read by the step (d) is represented by R, and a rate of a unit image to be coded is represented by F.

A twelfth aspect of the present invention is directed to the coding method, wherein the step (c) determines a minimum code volume Tmin based on a following equation or a value having a result equivalent to a result of the equation:

$$Tmin = \max(2 \cdot Rp - B, vbv_{13}bits + 2 \cdot Rp - vbv\_bs) \quad Rp = R/F$$

wherein a bit count read by the step (d) in a unit image is represented by Rp, an occupancy in the step (d) (a data capacity stored in the step (d)) is represented by B, an occupancy of a VBV buffer in a last unit image (a data capacity retained in the VBV buffer) is represented by vbv_bits, a size of the VBV buffer is represented by vbv_bs, a bit rate read by the step (d) is represented by R, and a rate of a unit image to be coded is represented by F.

A thirteenth aspect of the present invention is directed to the coding method, wherein the bit rate R at which a code stored at the step (d) is read is variable.

A fourteenth aspect of the present invention is directed to the coding method, wherein the step (c) serves to insert a stuffing into a video packet until a first relationship is not satisfied, when a present code volume of a unit image including a last coded macroblock constituting the unit image is smaller than the minimum code volume Tmin of the unit image and a number M of macroblocks to be coded subsequently to the last coded macroblock, a predetermined length VPlen of the video packet, the minimum code volume Tmin and a present code volume Sc have a first relationship: M×VPlen<Tmin−Sc, the code volume controlling step serves to constitute a video packet next to the video packet by a macroblock next to the last coded macroblock without inserting a stuffing into the video packet, when the first relationship is not established and the number M of macroblocks, the length VPlen of a video packet, the minimum code volume Tmin and the present code volume Sc have a second relationship: (M−1)×VPlen<Tmin−Sc.

According to the present invention, the above-mentioned structure can give the following effects.

According to the first aspect of the present invention, the coding device comprises coding means for coding an external input signal in a macroblock unit, first storing means for storing a code output from the coding means, second storing means for storing an output from the first storing means, and code volume control means for controlling transfer of the code stored in the first storing means to the second storing means based on a code volume of the code obtained by the coding means such that a length of a video packet constituted by the code is a predetermined length or less. Also in the case in which the video packet has a length limit, therefore, a structure thereof can be obtained corresponding to the limit.

According to the second aspect of the present invention, the code volume control means in the coding device controls storage of a stuffing in the second storing means based on a minimum code volume obtained for each unit image required for coding the unit image constituted by a video packet. Also in the case of an image having a small generated code volume such as a static image, therefore, it is possible to insert a minimum stuffing.

According to the third aspect of the present invention, the code volume control means in the coding device calculates a minimum code volume Tmin based on the following equation:

$$Tmin \geq 2 \cdot Rp - B \quad Rp = R/F$$

wherein Tmin indicates a minimum code volume, Rp indicates a bit count read from the second storing means in a unit image, R indicates a bit rate read from the second storing means, F indicates a rate of a unit image to be coded, and B indicates an occupancy in the second storing means. Therefore, an underflow of the second storing means can be prevented.

According to the fourth aspect of the present invention, the code volume control means in the coding device calculates a minimum code volume Tmin based on the following equation:

$$Tmin \geq vbv\_bits + 2 \cdot Rp - vbv\_bs \ Rp = R/F$$

wherein Tmin indicates a minimum code volume, Rp indicates a bit count read from the second storing means in a unit image, R indicates a bit rate read from the second storing means, F indicates a rate of a unit image to be coded, $vbv_{13}$ bits indicates an occupancy of a VBV buffer in a last unit image, and vbv_bs indicates a size of the VBV buffer. Therefore, an overflow of the VBV buffer can be prevented.

According to the fifth aspect of the present invention, the code volume control means in the coding device calculates a minimum code volume Tmin based on the following equation or a value having a result equivalent to a result of the equation:

$$Tmin = \max (2 \cdot Rp - B, vbv\_bits + 2 \cdot Rp - vbv\_bs) \ Rp = R/F$$

wherein Tmin indicates a minimum code volume, Rp indicates a bit count read from the second storing means in a unit image, R indicates a bit rate read from the second storing means, F indicates a rate of a unit image to be coded, B indicates an occupancy in the second storing means, vbv_ bits indicates an occupancy of a VBV buffer in a last unit image, and vbv_bs indicates a size of the VBV buffer. Therefore, both an underflow of the second storing means and an overflow of the VBV buffer can be avoided.

According to the sixth aspect of the present invention, the bit rate R read from the second storing means is variable. Therefore, the underflow of the second storing means or the overflow of the VBV buffer can be avoided effectively.

According to the seventh aspect of the present invention, when a present code volume of a unit image including a last coded macroblock constituting the unit image is smaller than the minimum code volume Tmin of the unit image and a number M of macroblocks to be coded subsequently to the last coded macroblock, a predetermined length VPlen of a video packet, the minimum code volume Tmin and a present code volume Sc have a first relationship: M·VPlen<Tmin− Sc, the code volume control means in the coding device inserts a stuffing into the video packet until the first relationship is not satisfied, and when the first relationship is not established and the number M of macroblocks, the length VPlen of a video packet, the minimum code volume Tmin and the present code volume Sc have a second relationship: (M−1)·VPlen<Tmin−Sc, the code volume control means constitutes a video packet next to the video packet by a macroblock next to the last coded macroblock without inserting a stuffing into the video packet. Therefore, a video packet having only a stuffing can be prevented from being generated, and an underflow of a transmitting buffer or an overflow of the VBV buffer can be prevented by inserting a minimum stuffing.

According to the eighth aspect of the present invention, the coding method comprises the steps of (a) coding an external input signal in a macroblock unit, (b) storing a code obtained at the coding step, (c) controlling an output of the code stored at the step (b) such that a length of a video packet constituted by the code is a predetermined length or less based on a code volume of the code obtained at the step (a), and (d) storing the output controlled at the step (c). Therefore, also in the case in which the video packet has a length limit, a structure thereof can be obtained corresponding to the limit.

According to the ninth aspect of the present invention, the step (c) in the coding method serves to control storage of a stuffing at the step (d) based on a minimum code volume obtained for each unit image constituted by a video packet which is required for coding the unit image. Also in the case of an image having a small generated code volume such as a static image, therefore, it is possible to insert a minimum stuffing.

According to the tenth aspect of the present invention, the step (c) in the coding method calculates a minimum code volume Tmin based on the following equation:

$$Tmin \geq 2 \cdot Rp - B \ Rp = R/F$$

wherein Tmin indicates a minimum code volume, Rp indicates a bit count with which a code stored at the step (d) in a unit image is read, R indicates a bit rate at which a code stored at the step (d) is read, F indicates a rate of a unit image to be coded, and B indicates an occupancy in the storage of a code at the step (d).

According to the eleventh aspect of the present invention, the step (c) in the coding method calculates a minimum code volume Tmin based on the following equation:

$$Tmin \geq vbv\_bits + 2 \cdot Rp - vbv\_bs \ Rp = R/F$$

wherein Tmin indicates a minimum code volume, Rp indicates a bit count with which a code stored at the step (d) in a unit image is read, R indicates a bit rate at which a code stored at the step (d) is read, F indicates a rate of a unit image to be coded, vbv_bits indicates an occupancy of a VBV buffer in a last unit image, and vbv_bs indicates a size of the VBV buffer. Therefore, an overflow of the VBV buffer can be prevented.

According to the twelfth aspect of the present invention, the step (c) in the coding method serves to calculate a minimum code volume Tmin based on the following equation or a value having a result equivalent to a result of the equation:

$$Tmin = \max (2 \cdot Rp - B, vbv\_bits + 2 \cdot Rp - vbv\_bs) \ Rp = R/F$$

wherein Tmin indicates a minimum code volume, Rp indicates a bit count with which a code stored at the step (d) in a unit image is read, R indicates a bit rate at which a code stored at the step (d) is read, F indicates a rate of a unit image to be coded, B indicates an occupancy in the storage of a code at the step (d), vbv_bits indicates an occupancy of a VBV buffer in a last unit image, and vbv_bs indicates a size of the VBV buffer. Therefore, both an underflow of the second storing means and an overflow of the VBV buffer can be avoided.

According to the thirteenth aspect of the present invention, the bit rate R at which a code stored at the step (d) is read is variable. Therefore, the underflow of the second storing means or the overflow of the VBV buffer can be avoided effectively.

According to the fourteenth aspect of the present invention, when a code volume of a unit image including a last coded macroblock constituting the unit image is smaller than the minimum code volume Tmin of the unit image and a number M of macroblocks to be coded subsequently to the last coded macroblock, a predetermined length VPlen of a video packet, the minimum code volume Tmin and a present code volume Sc have a first relationship: M·VPlen<Tmin−

Sc, the code volume controlling step in the coding method serves to insert a stuffing into the video packet until the first relationship is not satisfied, and when the first relationship is not established and the number M of macroblocks, the length VPlen of a video packet, the minimum code volume Tmin and the present code volume Sc have a second relationship: (M−1)·VPlen<Tmin−Sc, the step (c) serves to constitute a video packet next to a video packet by a macroblock next to the coded macroblock without inserting a stuffing into the video packet. Therefore, a video packet having only a stuffing can be prevented from being generated, and an underflow of a transmitting buffer or an overflow of the VBV buffer can be prevented by inserting a minimum stuffing.

In order to solve the above-mentioned problems, it is an object of the present invention to provide a coding device which does not generate a video packet having only a stuffing but can insert a minimum stuffing to satisfy a length limit of a video packet in the case in which the limit is set to the length of the video packet.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram illustrating a state of a temporary buffer and a transmitting buffer according to the first embodiment (in the case of an I—VOP), FIG. 3 is a diagram illustrating a state of the temporary buffer and the transmitting buffer according to the first embodiment (in the case of a P—VOP), FIG. 7 is a diagram showing an external input signal to be sent to the conventional coding device.

DESCRIPTION OF THE PREFERRED EMBODIMENTS

The present invention will be described specifically with reference to the drawings showing embodiments.

First Embodiment

Figure 1:
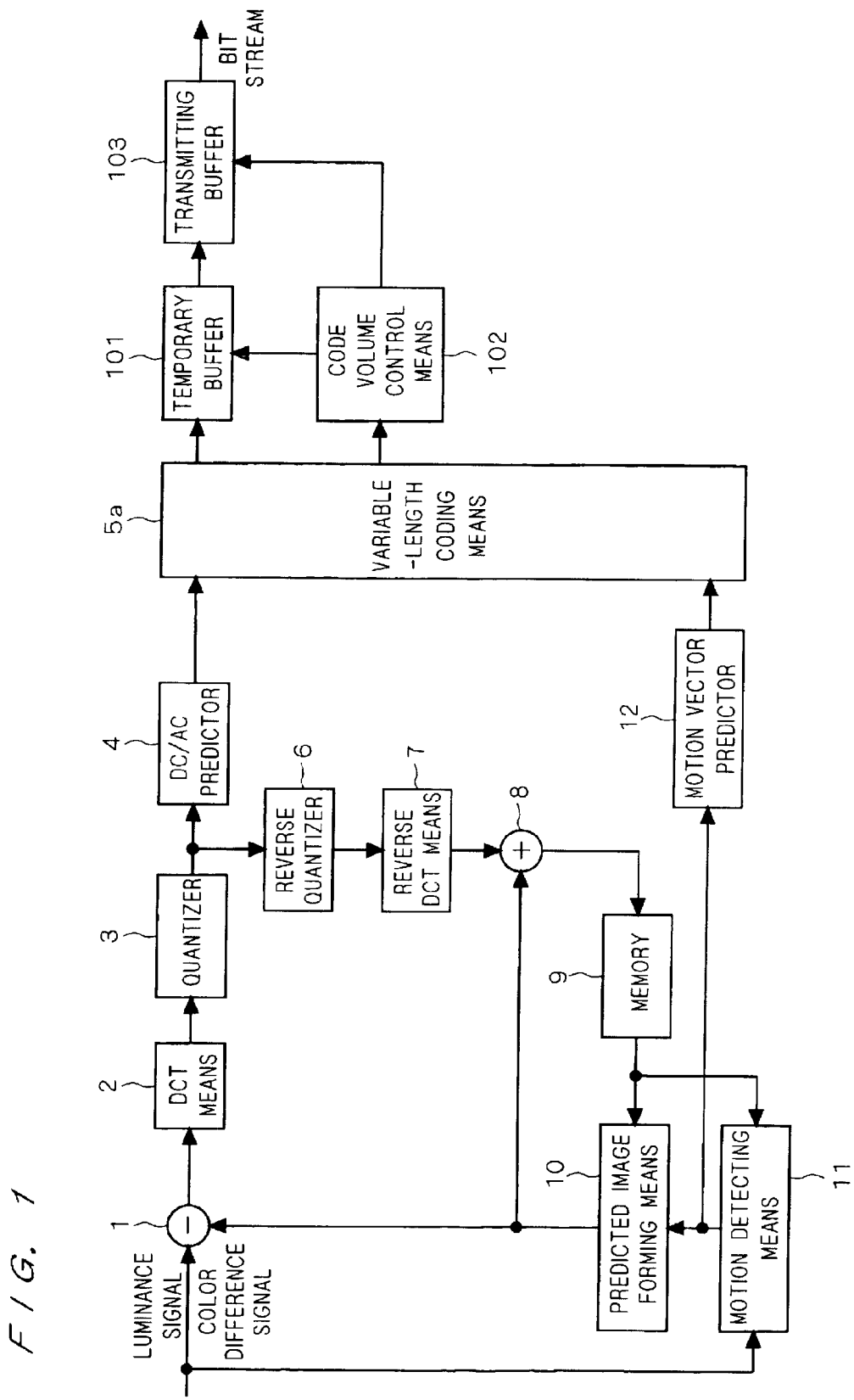
FIG. 1 is a block diagram showing a coding device according to a first embodiment.

FIG. 1 shows a coding device according to a first embodiment of the present invention. In FIG. 1, the reference numeral 1 denotes a subtracter for receiving an external input signal as a first input. An output of the subtracter 1 is input to a DC/AC predictor 4 and a reverse quantizer 6 through DCT means 2 and a quantizer 3. An output of the DC/AC predictor 4 is sent to a first input of variable—length coding means 5a.

On the other hand, an output of the reverse quantizer 6 is sent to a first input of an adder 8 through reverse DCT means 7. An output of the adder 8 is sent to a memory 9, and an output of the memory 9 is sent to a first input of predicted image forming means 10 and a first input of motion detecting means 11.

The external input signal is sent to a second input of the motion detecting means 11, and an output of the motion detecting means 11 is sent to a second input of the predicted image forming means 10 and a motion vector predictor 12. An output of the predicted image forming means 10 is sent to a second input of the subtracter 1 and a second input of the adder 8.

Moreover, an output of the motion vector predictor 12 is sent to a second input of the variable—length coding means 5a. Coding means is constituted by inclusion from the subtracter 1 for inputting the external input signal to the variable—length coding means 5a for outputting a variable—length code corresponding to the external input signal (Of course, the structure is only illustrated as an example and a well—known structure capable of carrying out coding corresponding to the external input signal can be used).

A first output of the variable—length coding means 5a is sent to a first input of a temporary buffer 101 (first storing means), and a second output of the variable—length coding means 5a is sent to an input of code volume control means 102.

A first output of the code volume control means 102 is sent to a second input of the temporary buffer 101, and an output of the temporary buffer 101 is sent to a first input of a transmitting buffer 103 (second storing means). A second output of the code volume control means 102 is sent to a second input of the transmitting buffer 103, and an output of the transmitting buffer 103 is output (transmitted) as a bit stream.

The bit stream thus output (transmitted) is received on the decoder side and is subjected to a decoding processing.

Next, an operation will be described.

First of all, a video signal is divided into macroblocks to be basic processing units as shown in FIG. 7 and is then input. For example, in the case in which the video signal to be input is 4:2:0, a size of 16 pixels×16 lines of a luminance signal (Y) is equal to that of 8 pixels×8 lines of two color difference signals (Cb, Cr) over a screen. Therefore, one macroblock is constituted by six blocks, each of the blocks having 8 pixels×8 lines.

In the case in which intracoding is to be carried out, each block is subjected to DCT and is then quantized. A DCT coefficient thus quantized is predicted by the DC/AC predictor 4 and is then variable—length coded together with additional information such as a quantization parameter. The DCT coefficient thus quantized is decoded through reverse quantization and reverse DCT, and a decoded image is stored in the memory 9.

In the case in which interceding is to be carried out, the motion detecting means 11 detects a motion vector indicative of a motion of the input macroblock. The motion vector indicates such a position that the smallest error is made with respect to the input macroblock in the decoded image stored in the memory 9.

Based on the motion vector, the predicted image forming means 10 forms a predicted image. Next, a difference between the input macroblock and the predicted image is obtained so that a difference signal is subjected to the DCT and is quantized.

The DCT coefficient thus quantized is variable—length coded together with the motion vector thus predicted and coded and the additional information such as the quantization parameter. Moreover, after the quantized DCT coefficient is subjected to the reverse quantization and the reverse DCT, it is added to the predicted image and is stored in the memory 9.

Next, an operation of the variable—length coding means 5a will be described in detail.

The variable—length coding means 5a codes the quantized DCT coefficient and the additional information for each macroblock (a coding step), writes them to the temporary buffer 101 (a first storing step) and outputs a code volume thereof to the code volume control means 102.

In the case of an I—VOP of an MPEG4, for example, an AC component of the quantized DCT coefficient of each block is first one—dimensionally scanned by zigzag scan or the like, and run—length coding for coding a combination of the number of 0s and a coefficient of non—zero is carried out. Coefficient data of each block which are run—length coded are written to the temporary buffer 101.

As shown in FIG. 2, mcbpc obtained by collectively coding MTYPE indicative of a macroblock type and CBPC indicating whether each block for a color difference has a non—zero AC coefficient, dquant indicative of a quantization parameter, a DC component of a DCT coefficient of each block, ac_pred_flag indicating whether AC prediction is carried out, and cbpy indicating whether each block of Y has a non-zero AC coefficient are coded in order after the coefficient data of each block which are stored in the temporary buffer 101, and are written to the temporary buffer 101.

A total of the code volumes is output to the code volume control means 102 for each macroblock.

In the case of a P—VOP of the MPEG4, similarly, the data coded in order shown in FIG. 3 are written to the temporary buffer 101.

The code volume control means 102 collects macroblocks such that a length of each video packet has a predetermined value (VPlen) or less based on a code volume of each macroblock which is output from the variable—length coding means 5a (a code volume controlling step), and transfers them from the temporary buffer 101 to the transmitting buffer 103 (a second storing step).

In the case of the MPEG4, for example, a header is added to a head of the video packet and is then rearranged and transferred to the transmitting buffer 103 in order of the defined bit stream as shown in FIGS. 2 and 3.

Moreover, the code volume control means 102 sets a minimum code volume Tmin for each VOP such that the transmitting buffer 103 does not cause an underflow or a VBV (Video Buffering Verifier) buffer (a virtual buffer required for receiving a video packet on the receiving side (a required capacity is described in a header of a transmitting bit stream, for example). At least a capacity for the I—VOP is usually set.) does not cause an overflow, and writes a stuffing to the transmitting buffer 103 if necessary and determines a break of the video packet such that the code volume of the VOP is not smaller than the Tmin.

More specifically, the minimum code volume Tmin implies a minimum code volume which is required such that the transmitting buffer 103 does not cause the underflow and the VBV buffer does not cause the overflow.

The details of the operation will be described below.

The code volume control means 102 calculates the minimum code volume Tmin required for the VOP before the coding for each VOP is started. For example, a bit count Rp read from the transmitting buffer 103 for a 1VOP period ((1/F) sec) is obtained as follows:

$$Rp=R/F$$

wherein a current occupancy of the transmitting buffer 103 in the coding device (a data capacity retained in the transmitting buffer 103) is represented by B (bits. An occupancy in the second storing means), a read bit rate of the transmitting buffer 103 is represented by R (bits/sec), and a rate of a VOP to be coded is represented by F (1/sec). In order for the transmitting buffer 103 to cause no underflow, therefore, it is sufficient that the occupancy of the transmitting buffer 103 is always Rp or more. Accordingly, it is preferable that the minimum code volume Tmin should be set as follows:

$$Tmin \geq 2 \cdot Rp - B.$$

Moreover, in the case in which the VBV buffer is to be managed, it is sufficient that an occupancy of the VBV buffer is vbv_bs—Rp or less such that the VBV buffer does not cause the overflow, wherein the occupancy of the VBV buffer (a data occupancy retained in the VBV buffer) for a time required for decoding a VOP prior to a current VOP is represented by vbv_bits (the occupancy of the VBV buffer) and a size of the VBV buffer is represented by vbv_bs.

Accordingly, it is preferable that a minimum code volume Tmin of the current VOP should be set as follows:

$$Tmin \geq vbv\_bits + 2 \cdot Rp - vbv\_bs.$$

Since the occupancy vbv_bits of the VBV buffer presumes an occupancy on the receiving side, and is calculated based on a read bit rate of the transmitting buffer 103, for example, it is changed with the passage of time.

Accordingly, the code volume control means 102 sets a minimum code volume Tmin required for the VOP before the coding of each VOP is started:

$$Tmin = \max (2 \cdot Rp - B, vbv\_bits + 2 \cdot Rp - vbv\_bs)$$

(max (a, b) indicates that a or b which is greater is selected as a value).

In the case in which the transmitting buffer 103 of the coding device is empty, it is not necessary to manage the underflow of the transmitting buffer 103 in such a structure that the reading operation of the transmitting buffer 103 is stopped (halted). Therefore, it is preferable that the following equation should be set:

$$Tmin = vbv\_bits + 2 \cdot Rp - vbv\_bs.$$

As described above, the vbv_bits is changed on a time basis. Therefore, the value of the minimum code volume Tmin is also changed on a time basis and is calculated for each VOP.

Figure 4:
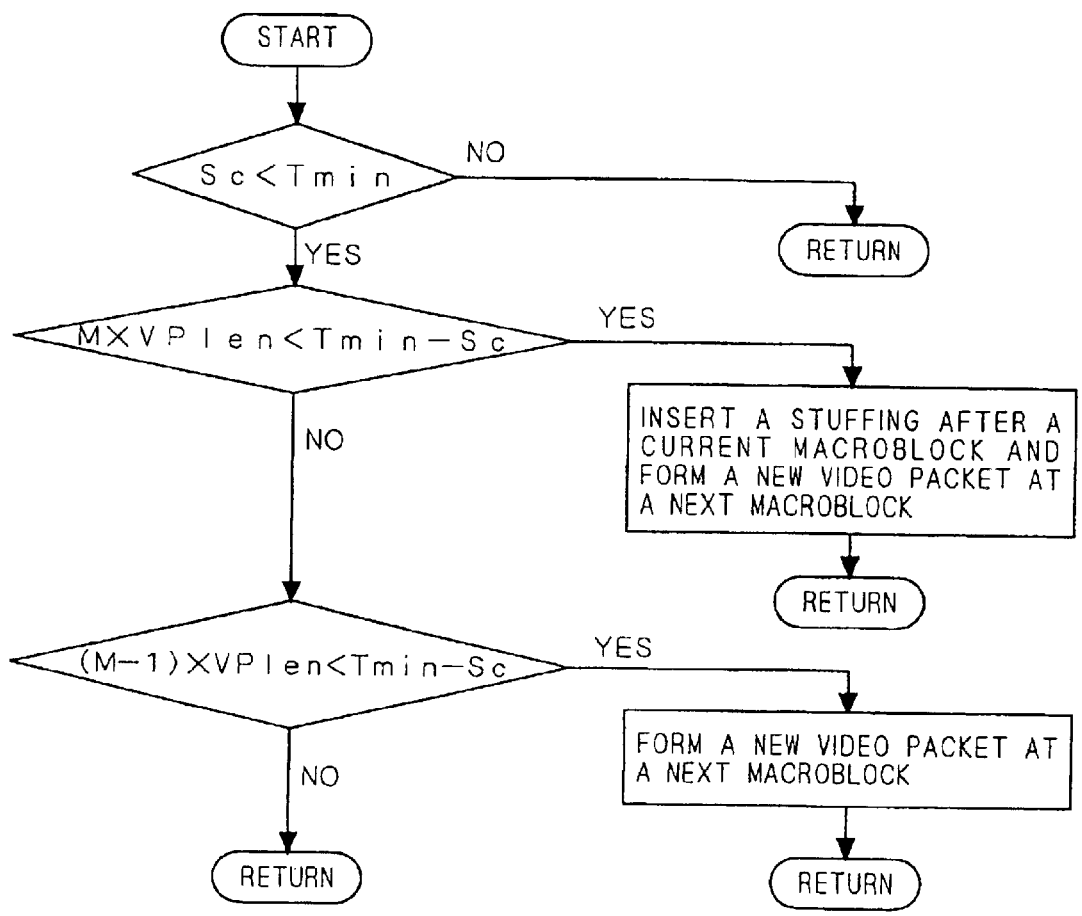
FIG. 4 is a flow chart for explaining an operation in the coding device according to the first embodiment.

Next, the code volume control means 102 calculates a present code volume Sc of the current VOP for each macroblock and decides whether a new video packet is to be constituted at a next macroblock or not and whether a stuffing is to be inserted into a current video packet or not in accordance with a flow chart shown in FIG. 4 and a structure of a video packet shown in FIG. 5.

The total number of macroblocks constituting the VOP is represented by A, a macroblock number of a current macroblock (a last coded macroblock) is represented by K($0 \leq K \leq A-1$), and the number M of succeeding macroblocks to be coded (the number M of residual macroblocks) is represented by A−K−1 (that is, M A−K−1).

In the case in which the present code volume Sc of the VOP including the current macroblock is smaller than the minimum code volume Tmin of the VOP, if (a first relationship)

$$M \cdot VPlen < Tmin - Sc \qquad (1),$$

a stuffing is inserted into a current video packet to constitute a new video packet at a next macroblock until the relationship in the equation (1) is not satisfied.

If the equation (1) is not established but the following equation is established (a second relationship), the stuffing is not inserted into the current video packet but a new video packet is constituted at a next macroblock:

$$(M-1)\cdot VPlen < Tmin - Sc \qquad (2).$$

In other cases, the macroblocks are collected to constitute a video packet such that a length of each video packet is VPlen or less as described above.

An operation of the flow chart shown in FIG. 4 will be described below.

Figure 5A:
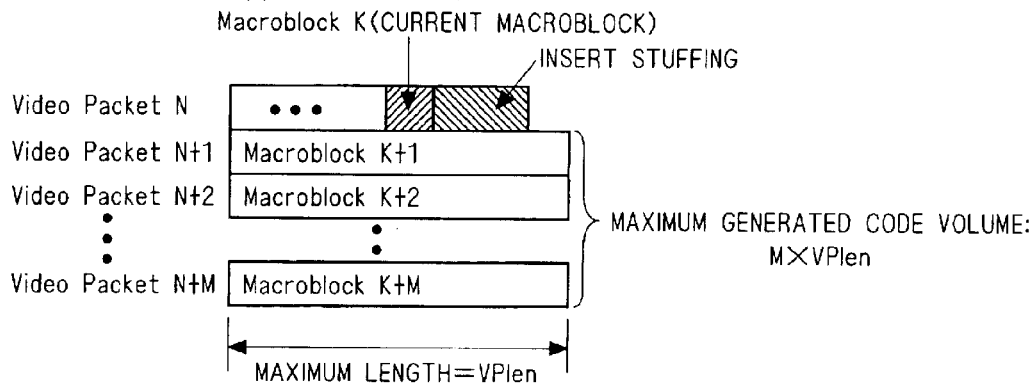
FIGS. 5A to 5C are diagrams showing a structure of a video packet according to the first embodiment.

In the case in which the equation (1) is established, M residual video packets can be constituted as shown in FIG. 5A if the number of residual macroblocks is M. Therefore, a code having a code volume of M·VPlen can be generated.

In this case, accordingly, an insufficient code volume can be obtained as follows.

$$Tmin - Sc - M \cdot VPlen$$

In the case of the MPEG4, for example, (Tmin−Sc−M·VPlen+L−1)/L stuffing macroblocks are inserted into the current video packet, wherein a code length of the stuffing macroblock is represented by L.

Figure 5B:
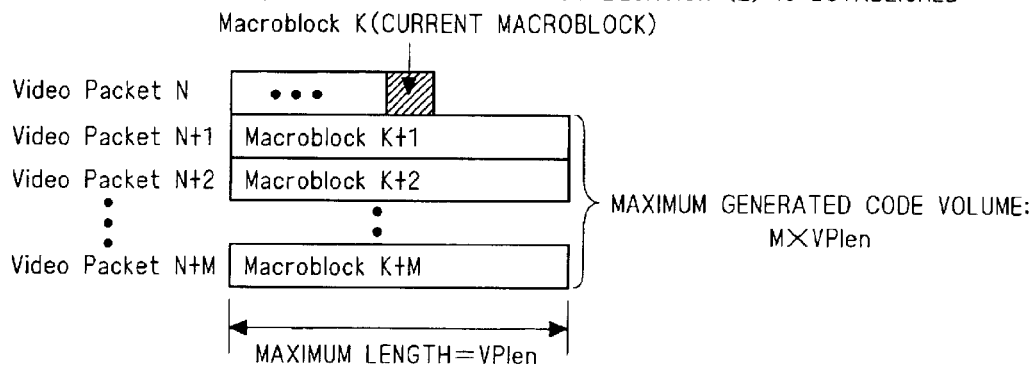
Figure 5C:
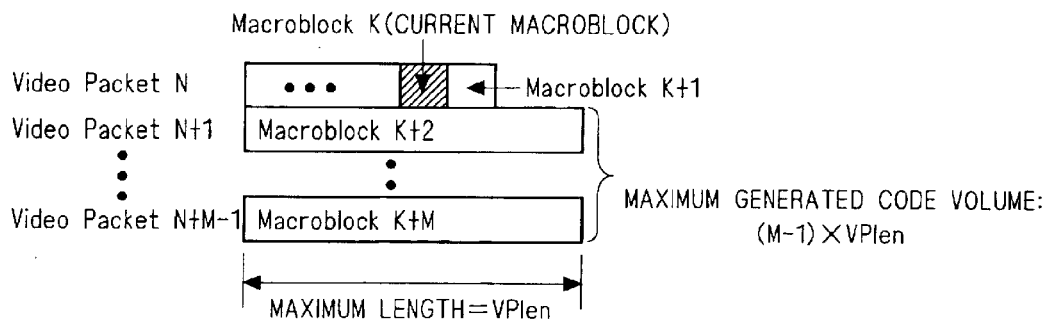
Figure 6:
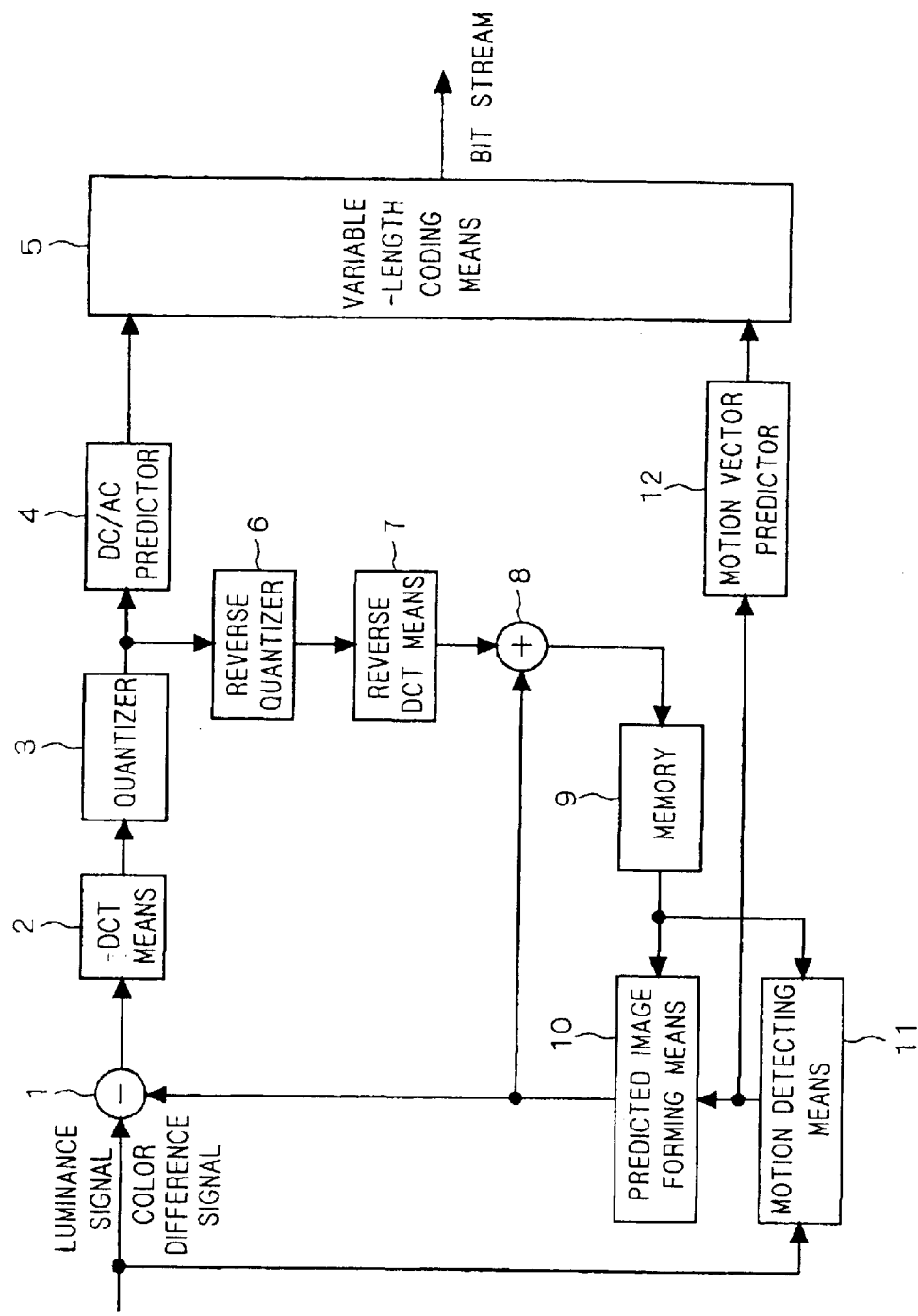
FIG. 6 is a block diagram showing a conventional coding device.
Figure 8A:
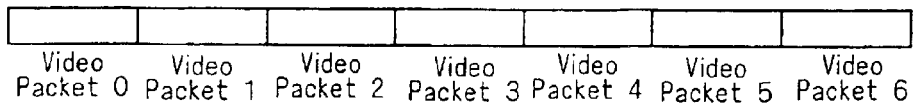
FIGS. 8A to 8D are diagrams showing a structure of a bit stream in the conventional coding device.
Figure 8B:
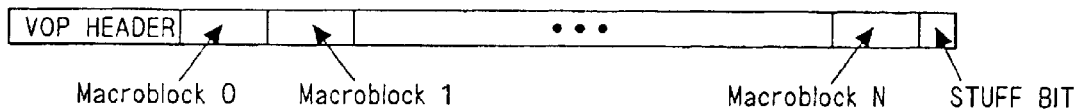
Figure 8C:
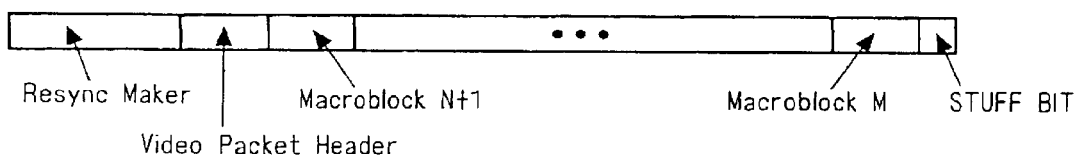
Figure 8D:
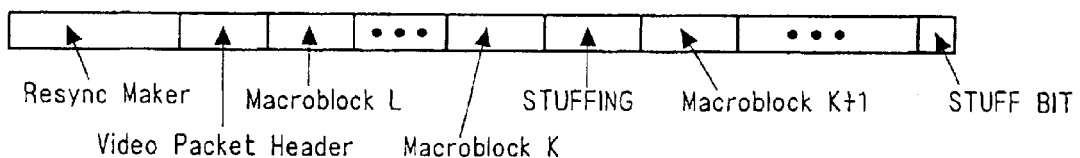
Figure 9:
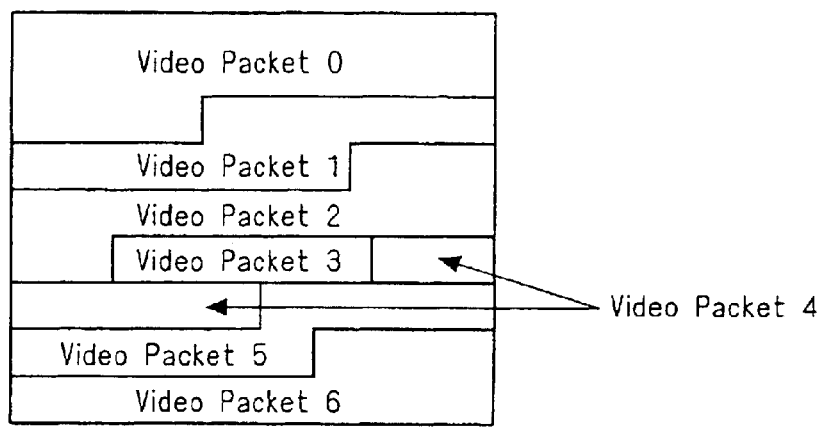
FIG. 9 is a diagram showing a position of a video packet over a screen in the conventional coding device.

Next, in the case in which the equation (1) is not established but the equation (2) is established, a residual generated code volume of (M−1)·VPlen is obtained at a maximum as shown in FIG. 5C if a next macroblock is inserted into the current video packet. Therefore, if a generated code volume of the next macroblock is 0, Sc<Tmin is obtained based on the equation (2).

If a new video packet is constituted at a next macroblock, a residual generated code volume of M·VPlen is obtained at a maximum as shown in FIG. 5B.

If the equation (1) is not satisfied, a relationship of M·VPlen≧Tmin−Sc is obtained and a code having a code volume of M·VPlen can be generated after the next macroblock. Therefore, the following equation can be obtained.

A code volume for all the macroblocks constituting the VOP $$= M \cdot VPlen + Sc$$

$$\geq Tmin$$

Accordingly, it is not necessary to insert the stuffing into the current video packet.

Similarly, in the case in which the equation (2) is not established, it can be guaranteed that the code volume of (M−1)·VPlen is generated in a residual video packet even if a next macroblock is inserted into the current video packet as shown in FIG. 5C. Therefore, it is not necessary to insert the stuffing at the present time.

By thus controlling the code volume based on the flow chart of FIG. 4, a structure of the video packet can be determined to insert a minimum stuffing under the restriction that a maximum length of the video packet is VPlen.

While the read rate of the transmitting buffer 103 is represented by R in the setting of the Tmin in the above-mentioned embodiment, similarly, the Tmin can be set such that the underflow of the transmitting buffer 103 or the overflow of the VBV buffer is not caused even if the read rate is not fixed but variable.

The case in which the read rate of the transmitting buffer 103 is variable is equivalent to the case in which a maximum transmission rate is determined and is assigned depending on a type of information to be transmitted (such as a video or a speech), for example.

Also in this case, the code volume is controlled based on the flow chart of FIG. 4. Consequently, the insertion of the stuffing and the break of the video packet can be determined to carry out control such that a code volume of each VOP is Tmin or more.

The case in which data partition of the MPEG4 (data are constituted for each macroblock shown in FIG. 2 every category of (1) mcbpc, dquant and DC component, (2) ac_pred_flag and cbpy and (3) coefficient data of each block in the transmitting buffer 103) has been taken as an example in the above-mentioned embodiment. Also in the case of no data partition or H.263, a code volume can be controlled with the same structure as that described above if a video packet has a length limit.

Referring to the category for the data partition, a structure of (1) not_coded, mcbpc and motion vector, (2) cbpy and dquant and (3) coefficient data of each block may be stored in the transmitting buffer 103 as shown in FIG. 3, for example. Basically, it is preferable that the coefficient data of each block and additional information related to the coefficient data should be classified as categories. Moreover, (1) to (3) are not always required for the category and an optional number of categories can be permitted.

Furthermore, it is apparent that the present invention can also be applied to the case in which an input signal is not 4:2:0 and the case in which a VOP (unit image) is not rectangular (for example, an optional shape which can be taken by an object in a screen).

While the invention has been shown and described in detail, the foregoing description is in all aspects illustrative and not restrictive. It is therefore understood that numerous modifications and variations can be devised without departing from the scope of the invention.

What is claimed is:

1. A coding device comprising:

a coder for coding an external input signal in a macroblock unit;

a first storing unit for storing a code output from said coder;

a second storing unit for storing an output from said first storing unit; and a code volume controller for controlling the transfer amount of said code stored in said first storing unit to said second storing unit based on a code volume of said code obtained by said coder such that a length of a video packet constituted by said code is predetermined length or less;

wherein the code volume controller calculates a present code volume (Sc) for each video object (VOP) and decides whether a stuffing is to be inserted into said video packet or a new video packet constituted, based on a relationship between the present code volume (Sc) and a minimum code volume (Tmin);

wherein, if decided, said code volume controller controls storage of a stuffing of a video packet in said second storing unit based on said minimum code volume obtained for each VOP unit image constituted by a video packet which is required for coding said unit image, such that said second storing unit does not cause an underflow.

2. The coding device according to claim 1, wherein
said code volume controller determines a minimum code volume Tmin to satisfy a following equation:

$$Tmin \geq 2 \cdot Rp - B$$

$$Rp = R/F$$

wherein a bit count read from said second storing unit in a unit image is represented by Rp, an occupancy in said second storing unit is represented by B, a bit rate read from said second storing unit is represented by R, and a rate of a unit image to be coded is represented by F.

3. The coding device according to claim 2, wherein said bit rate R read from said second storing is variable.

4. The coding device according to claim 1, wherein
said code volume controller determines a minimum code volume Tmin based on a following equation or a value having a result equivalent to a result of said equation:

$$Tmin = \max(2 \cdot Rp - B, vbv\_bits + 2 \cdot Rp - vbv\_bs)$$

$$Rp = R/F$$

wherein a bit count read from said second storing unit in a unit image is represented by Rp, an occupancy in said second storing unit is represented by B, an occupancy of a VBV buffer in a last unit image is represented by vbv_bits, a size of said VBV buffer is represented by vbv_bs, a bit rate read from said second storing unit is represented by R, and a rate of a unit image to be coded is represented by F.

5. The coding device according to claim 4, wherein said bit rate R read from said second storing unit is variable.

6. The coding device according to claim 1, wherein
said code volume controller inserts a stuffing into a video packet while a first relationship is satisfied when a present code volume of a unit image including a last coded macroblock constituting said unit image is smaller than said minimum code volume Tmin of said unit image and a number M of macroblocks to be coded subsequently to said last coded macroblock, a predetermined length VPlen of said video packet, said minimum code volume Tmin and said present code volume Sc have said first relationship:

$$M \cdot VPlen \geq Tmin - Sc,$$

said code volume controller constitutes a new video packet next to said video packet by inserting a macroblock next to said last coded macroblock without inserting a stuffing into said video packet, when said first relationship is not established and when said number M of macroblocks, said length VPlen of video packet, said minimum code volume Tmin and said present code volume Sc have a second relationship:

$$(M-1) \cdot VPlen < Tmin - Sc.$$

7. A coding method comprising the steps of:
(a) coding an external input signal in a macroblock unit;
(b) storing a code obtained at said step (a);
(c) controlling an output of said code stored at said step (b) such that a length of a video packet constituted by said code obtained at said step (a) is a predetermined length or less based on a code volume of said code, wherein a present code volume (Sc) is calculated for each video object plane (VOP) and a decision is made as to whether a stuffing is to be inserted into said video packet or a new video packet constituted, based on a relationship between the present code volume (Sc) and a minimum code volume (Tmin); and
(d) storing said output controlled by said step (c), wherein, if decided,
said step (c) serves to control storage of a stuffing of a video packet at said step (d) based on said a minimum code volume obtained for each video object plane (VOP) unit image constituted by a video packet which is required for coding said unit image.

8. The coding method according to claim 7, wherein
said step (c) serves to determine a minimum code volume Tmin to satisfy a following equation:

$$Tmin \geq 2 \cdot Rp - B \quad Rp = R/F$$

wherein a bit count read by said step (d) in a unit image is represented by Rp, an occupancy in said step (d) is represented by B, a bit rate read by said step (d) is represented by R, and a rate of a unit image to be coded is represented by F.

9. The coding method according to claim 8, wherein
said bit rate R at which a code stored at said step (d) is read is variable.

10. The coding method according to claim 7, wherein
said step (c) determines a minimum code volume Tmin based on a following equation or a value having a result equivalent to a result of said equation:

$$Tmin = \max(2 \cdot Rp - B, vbv\_bits + 2 \cdot Rp - vbv\_bs)$$

$$Rp = R/F$$

wherein a bit count read by said step (d) in a unit image is represented by Rp, an occupancy in said step (d) is represented by B, an occupancy of a VBV buffer in a last unit image is represented by vbv_bits, a size of said VBV buffer is represented by vbv_bs a bit rate read by said step (d) is represented by R, and a rate of a unit image to be coded is represented by F.

11. The coding method according to claim 10, wherein
said bit rate R at which a code stored at said step (d) is read is variable.

12. The coding method according to claim 7, wherein
said step (c) serves to insert a stuffing into a video packet while a first relationship is satisfied when a present code volume of a unit image including a last coded macroblock constituting said unit image is smaller than said minimum code volume Tmin of said unit image and a number M of macroblocks to be coded subsequently to said last coded macroblock, a predetermined length VPlen of said video packet, said minimum code volume Tmin and a present code volume Sc have a first relationship: M·VPlen Tmin−Sc,
said code volume controlling step serves to constitute a new video packet next to said video packet by inserting a macroblock next to said last coded macroblock without inserting a stuffing into said video packet, when said first relationship is not established and when said number M of macroblocks, said length VPlen of a video packet, said minimum code volume Tmin and said present code volume Sc have a second relationship: (M−1)·VPlen<Tmin−Sc.

13. A video signal coding apparatus, comprising:
a video coder that codes a video signal as a video packet;
a first storage unit operatively connected to said video coder and stores said coded video signal;

a second storage unit operatively connected to said first storage unit and stores an output from said first storage unit; and a control volume controller, operatively connected to said video coder, first storage unit and said second storage unit, said control volume controller determining a minimum code volume (Tmin) and a present code volume (Sc) for each video object plane (VOP) unit image of said video packet, the control volume controller determining whether a stuffing is to be inserted into said video packet or a new video packet constituted, based on a relationship between said present code volume (Sc) and said minimum code volume (Tmin) and controlling a break of the video packet and the insertion of a stuffing such that said present code volume (Sc) of the VOP is not smaller than said minimum code volume (Tmin).

14. A method for coding a video signal, comprising:

coding said video signal as a video packet, by a video coder;

storing said encoded video signal in a first storage unit operatively connected to said video coder;

storing an output of said first storage unit in a second storage unit operatively connected to said first storage unit; and determining, by a control volume controller operatively connected to said video coder, first storage unit and said second storage unit, a minimum code volume (Tmin) and a present code volume (Sc) for each video object plane (VOP) unit image of said video packet, the control volume controller determining whether a stuffing is to be inserted into said video packet or a new video packet constituted, based on a relationship between said present code volume (Sc) and said minimum code volume (Tmin) and controlling a break of the video packet and the insertion of a stuffing such that said present code volume Sc of the VOP is not smaller than said minimum code volume (Tmin).

* * * * *